United States Patent [19]
Fujigiwa

[11] Patent Number: 5,692,691
[45] Date of Patent: *Dec. 2, 1997

[54] DOUBLE TRIGGER ACTUATED REEL

[75] Inventor: Chikara Fujigiwa, Ueda, Japan

[73] Assignee: Charles C. Worth Corporation, San Rafael, Calif.

[*] Notice: The term of this patent shall not extend beyond the expiration date of Pat. No. 5,697,566.

[21] Appl. No.: 620,007

[22] Filed: Mar. 21, 1996

[51] Int. Cl.⁶ .................................................. A01K 89/01
[52] U.S. Cl. .................... 242/239; 242/244; 242/291
[58] Field of Search ............................... 242/243, 244, 242/238, 239, 291

[56] References Cited

U.S. PATENT DOCUMENTS

| | | | |
|---|---|---|---|
| 3,036,789 | 5/1962 | Mauborgne | 242/238 |
| 3,044,730 | 7/1962 | Yeada | 242/238 X |
| 4,529,142 | 7/1985 | Yoshikawa | 242/243 |
| 4,634,073 | 1/1987 | Coquelet | 242/291 X |
| 4,676,451 | 6/1987 | Dispas | 242/291 X |
| 4,749,285 | 6/1988 | Noda | 242/244 |

*Primary Examiner*—Daniel P. Stodola
*Assistant Examiner*—Emmanuel M. Marcelo
*Attorney, Agent, or Firm*—Virginia H. Meyer

[57] ABSTRACT

A double trigger actuated reel for allowing both actuation of the free spool mechanism and adjustment of the drag brake mechanism of a close face spinning reel with a single hand. The inventive device includes a main body having a reel mechanism mounted thereto. The reel mechanism includes a spool upon which fishing line can be wound, a drag plunger effecting frictional drag on the spool, and a main shaft which can be forwardly biased to cause free-spooling of the reel mechanism. A trigger assembly is mounted relative to the main body and includes a first trigger arm which can be pivoted to selectively effect movement of the drag plunger to operate the drag brake mechanism and a second trigger arm which can be pivoted to selectively effect movement of the main shaft to operate the free spool mechanism.

15 Claims, 2 Drawing Sheets

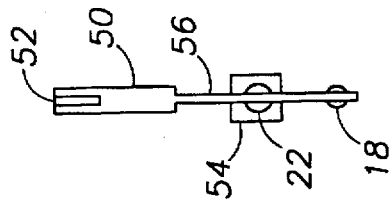
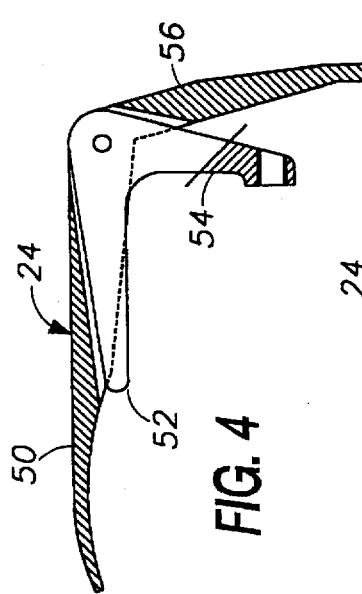
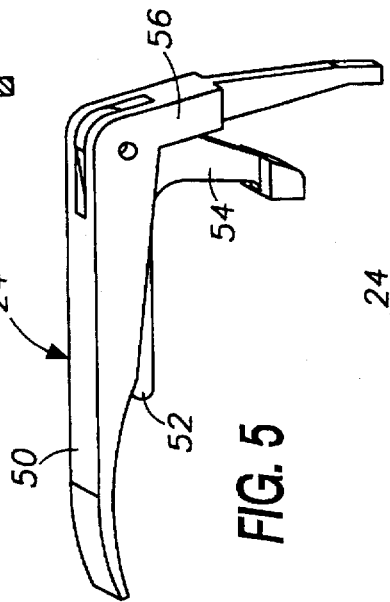
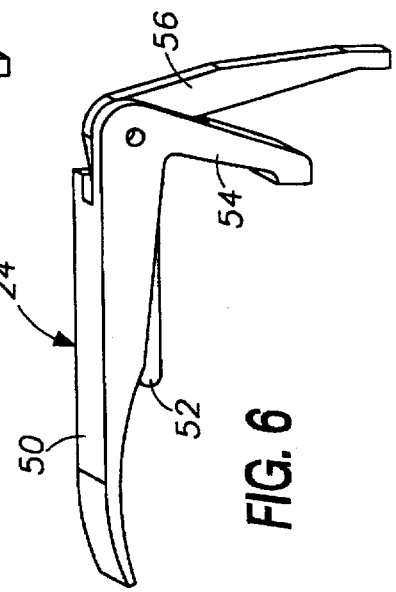
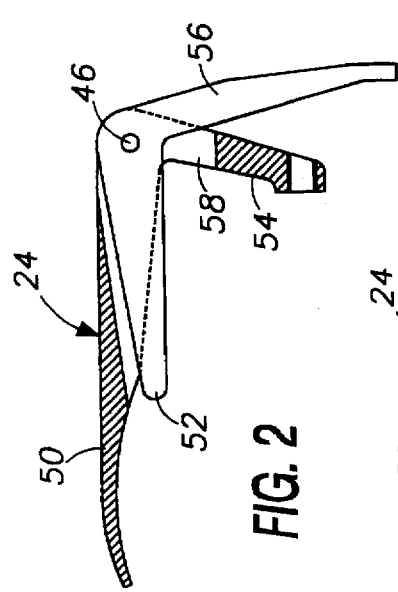
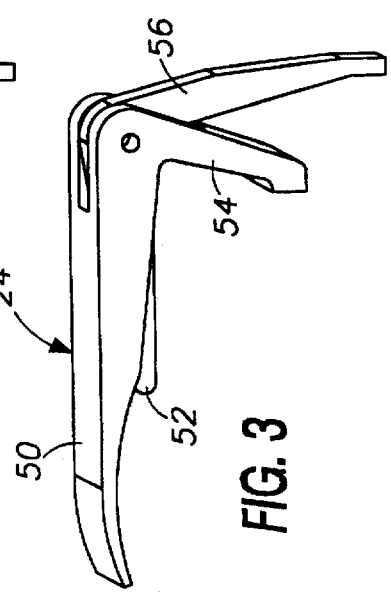

DOUBLE TRIGGER ACTUATED REEL

BACKGROUND OF THE INVENTION

1. Field of the Invention

The present invention relates to close face spinning reels and more particularly pertains to a double trigger actuated reel for permitting actuation of the free spool mechanism and adjustment of the drag brake mechanism of a close face spinning reel by a single hand of a fisherman.

2. Description of the Prior Art

The use of fishing reels generally described as close face spinning reels, or CFS reels, is known in the prior art. More specifically, known close face spinning reels include a trigger which actuates a free-spool mechanism to release line for casting. A typical CFS reel has a completely separate drag or braking system for providing resistance to the pull of fish during retrieval of the fishing line. Operating this separate drag system usually requires both hands of the fisherman. As a result it is difficult to make any drag adjustments while fighting a fish.

An example of a known prior art close face spinning reel can be seen within U.S. Pat. No. 4,749,285 which includes a reel body and a spool rotatably supported to a front portion of the reel body. A drag thumbscrew is provided for setting an initial lead of a drag brake member, and a drag lever is provided for adjusting within a predetermined range an initial load set by the thumbscrew. While this patent discloses a lever operated adjusting mechanism for setting the load of the drag brake mechanism, there is teaching or suggestion of incorporating the lever action into the free spool mechanism operating lever.

OBJECTS AND SUMMARY OF THE INVENTION

It is an object of the present invention to provide a new double trigger actuated reel apparatus which includes a double trigger assembly serving to operate a free spool mechanism and to effect adjustment of a drag mechanism by a single hand of a fisherman.

It is another object of the present invention to provide a new double trigger actuated reel in which the drag mechanism is capable of being adjustably preset to a predetermined maximum setting.

It is another object of the present invention to provide a new double trigger actuated reel in which the triggers operate so as to be easily manipulated by either a right or a left handed fishermen.

It is another object of the present invention to provide a new double trigger actuated reel in which the one of the triggers additionally controls a baitfeeder function allowing for the ability to quickly apply strong drag while in a free spool condition without having to first reengage the crank retrieval mechanism of the reel.

It is another object of the present invention to provide a new double trigger actuated reel in which accidental actuation of the free spool mechanism is substantially reduced or eliminated during use of one of the triggers to manipulate drag tension.

It is another object of the present invention to provide a new double trigger actuated reel which may be easily and efficiently manufactured and marketed.

It is another object of the present invention to provide a new double trigger actuated reel which is of a durable and reliable construction.

It is another object of the present invention to provide a new double trigger actuated reel which is susceptible of a low cost of manufacture with regard to both materials and labor, and which accordingly is then susceptible of low prices of sale to the consuming public, thereby making such double trigger actuated reels economically available to the buying public.

To attain these and other objects, the present invention generally comprises a double trigger actuated reel for allowing actuation of the free spool mechanism and adjustment of the drag brake mechanism of a close face spinning reel by a single hand of a fisherman. The inventive device includes a main body having a reel mechanism mounted therein. The reel mechanism includes a spool upon which fishing line can be wound, a drag plunger effecting frictional drag on the spool, and a main shaft which can be forwardly biased to cause free-spooling of the reel mechanism. A double trigger assembly is mounted relative to the main body and includes a first trigger arm which can be pivoted to selectively effect movement of the drag plunger to operate the drag brake mechanism and a second trigger arm which can be pivoted to selectively effect movement of the main shaft to operate the free spool mechanism.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a cross section of FIG. 3.

FIG. 3 is an isometric illustration of the double trigger assembly.

FIG. 4 is a cross section of FIG. 5.

FIG. 5 is an isometric illustration of the alternative form of the double trigger assembly.

FIG. 6 is an isometric illustration of a simplified form of the double trigger assembly.

FIG. 7 is an end elevational view of the alternative form of the double trigger assembly of the present invention.

DESCRIPTION OF THE PREFERRED EMBODIMENT

Figure 1:
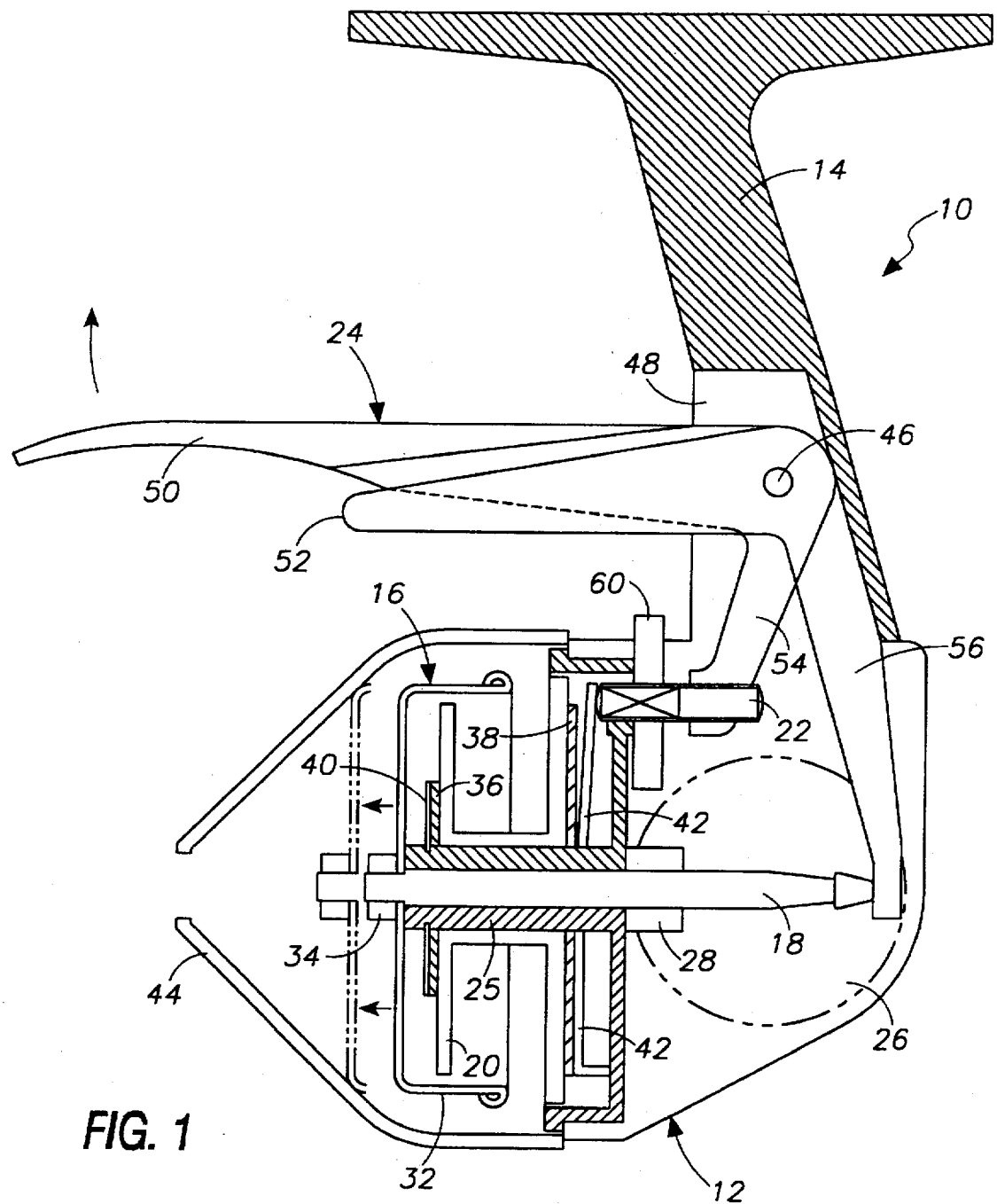
FIG. 1 is a cross sectional view of a double trigger actuated reel according to the present invention.

With reference now to the drawings, and in particular to FIGS. 1–7 thereof, a new double trigger actuated reel embodying the principles and concepts of the present invention and generally designated by the reference numeral 10 will be described.

More specifically, the double trigger actuated reel 10 comprises a main body 12 which can be supported relative to a fishing rod by a reel stem 14 projecting from the main body as shown in FIG. 1 of the drawings. A conventional reel mechanism 16 is mounted to the main body 12 and includes a main shaft 18 which projects through a spool 20 upon which unillustrated fishing line can be wound. The main shaft 18 forms a part of a conventionally known free spool mechanism of the reel 16 and is manipulatable so as to allow the fishing line to be freely dispensed from the spool 20 during a casting procedure or the like. The reel mechanism 16 further includes a drag plunger 22 which is a part of a drag brake mechanism of the reel 16 and is slidably mounted relative to the main body 12. The drag plunger 22 can be manipulated to effect adjustment of frictional drag against rotation of the spool 20 relative to the main body 12. A double trigger assembly 24 is pivotally mounted relative to the reel stem 14 and can be manually manipulated to effect selective and individual longitudinal movement of the main shaft 18 and/or the drag plunger 22. By this structure, the double trigger assembly 24 permits for single-handed movement of both the main shaft 18 and the drag plunger 22 to effect both free-spooling of line from the reel 10 and adjustment of the drag on the spool 20, respectively.

Referring now to FIG. 1 in particular, it can be shown that the main shaft of the conventional reel mechanism 16 projects through a main body post 25 within the main body 12. A main gear 26 is rotatably mounted relative to the main body 12 and can be rotated through an unillustrated crank or other means connected thereto. A pinion gear 28 is slidably keyed on main shaft 18 and engages the main gear 26 during a winding operation of the reel 16. The main shaft 18 is movably carried in the main body post 25 and is secured to a rotor 32 by a rotor nut 34. The rotor 32 operates to wind the fishing line onto the spool 20 when the main shaft 18 is rotated through the main and pinion gears 26 and 28. The spool 20 is movably carried on the main body support post 25 and is held in position between a pair of friction washers 36 and 38 which are in turn held in place between a spool clip 40 and a drag plate 42, respectively. By this structure, the main shaft 18 can be forwardly biased to actuate the free spool mechanism and to press the rotor 32 against a front hood 44 of the device 10, as shown in phantom 32ph, to secure the line prior to casting. The double trigger assembly 24 is pivotally supported by a support pin 46 within a cavity 48 of the reel stem 14 to permit pivoting of the double trigger assembly 24 to selectively move the drag plunger or the main shaft in a manner which will subsequently be described in more detail.

With continuing reference to FIG. 1, it can be shown that the double trigger assembly 24 includes a first trigger arm 50 and a second trigger arm 52 pivotally coupled to the reel stem 14 or otherwise relative to the main body 12. Preferably, the first trigger arm 50 and the second trigger arm 52 are pivotally coupled to the reel stem 14 by the single support pin 46 extending therethrough. The first trigger arm 50 and a second trigger arm 52 can be laterally disposed or otherwise adjacently positioned, but are preferably oriented as shown in the drawings wherein the first trigger arm 50 is substantially longer than the second trigger arm 52 with the second trigger arm extending below the first trigger arm.

A drag actuator arm 54 is secured to and depends from the first trigger arm 50 and is engaged with the drag plunger 22 to effect depression of the drag plunger in response to pivoting of the first trigger arm 50 in a vertical direction. Similarly, a free spool actuator arm 56 is secured to and depends from the second trigger arm 52 and is positioned for engagement with the distal end of the main shaft 18. This configuration allows the second trigger arm 52 to be manually biased in a vertical direction to effect movement of the free spool actuator arm 56 which will then engage the main shaft 18 to cause free spooling of line from the spool 20. By this structure, an individual utilizing the invention 10 can pivot either or both of the first and second trigger arms 50 and 52 to control the drag brake mechanism and the free spool mechanism, as desired.

As shown in FIGS. 2 and 3, the first trigger arm 50 is preferably shaped so as to define a through-extending cavity 58 within which the second trigger arm 52 is pivotally mounted by the support pin 46. The through-extending cavity 58 creates a bifurcation in both the first trigger arm 50 and the drag actuator arm 54 which permits projection of the second trigger arm 52 and the free spool actuator arm 56, respectively, therethrough. As shown in FIG. 6, the first trigger arm 50 and the drag actuator arm 54 do not need to be bifurcated, but instead can simply be connected at lateral corner portions thereof to enable ease of construction and reduced material consumption in realizing the invention 10.

Referring now to FIGS. 4, 5, and 7, it can be shown that the trigger assembly 24 can be alternatively configured such that the drag actuator arm 54 is secured to and depends from the second trigger arm 52, and the free spool actuator arm 58 is secured to and depends from the first trigger arm 50. By this structure, an individual utilizing the invention 10 can pivot either or both of the first and second trigger arms 50 and 52 to control the free spool mechanism and the drag brake mechanism, as desired.

To provide for limiting adjustment of the drag plunger 22 to a desired maximum position during operation of the trigger assembly 24, it is desirable that the drag plunger be threaded into the drag actuator arm 54. A drag dial 60 is keyed to the drag plunger 22 and is positioned for abutting engagement against a portion of the main body 12 so as to limit the drag plunger 22 to a desired maximum depression of the drag actuator arm 54 during use of the device 10. Alternatively, the drag plunger 22 can be fixed to the drag actuator arm 54, with the drag dial 60 being threaded to the drag plunger 22 to accomplish the same result. This configuration permits the frictional drag on the spool 20 to be adjusted to a maximum amount, whereby operation of the trigger assembly 24 as described above will allow for variable adjustment of the drag up to the maximum amount as desired.

In use, the appropriate trigger arm 50 or 52 of the double trigger assembly 24 of the present invention 10 can be easily manipulated to allow for adjustment of the drag plunger 22 via the trigger arm, with the other trigger arm being operable to actuate the free spool mechanism of the reel mechanism 16. During a bait feeding operation, the reel mechanism 16 can remain in the free spool orientation, while a live bait pulls the hook around in the water. When it is desired to quickly actuate a strong drag to set the hook in a fish, a manipulation of the appropriate trigger arm 50 or 52 will bias the main shaft 18 forward to snub or pinch the fishing line between the rotor 32 and the hood 44, to easily provide a sudden and very large drag for setting the hook without having to first reengage the reel mechanism by rotating the reel handle one turn, which is the conventional process.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A double trigger actuated reel comprising:
   a main body supportable relative to a fishing rod;
   a reel stem projecting from the main body;

a reel mechanism mounted to the main body and including a spool for receiving fishing line and a main shaft projecting through the spool, the main shaft being manipulatable so as to allow fishing line to be freely dispensed from the spool, the reel mechanism further including a drag plunger slidably mounted relative to the main body which is adapted to be manipulated to effect adjustment of frictional drag against rotation of the spool relative to the main body;

a double trigger assembly movably mounted relative to the reel stem and including a first trigger arm pivotally mounted at a first location and a second trigger arm pivotally mounted at said first location, wherein said first trigger arm extends substantially adjacent to and in the same direction as said second trigger arm, wherein said first and second trigger arms extend relative to said fishing rod so as to enable the user to grasp the fishing rod with one hand and manipulate said first and second trigger arms with at least one finger of said hand without substantial movement of said hand relative to said rod: wherein pivoting of said first trigger arm effects selective movement of the drag plunger, and pivoting of said second trigger arm effects selective movement of the main shaft.

2. The double trigger actuated reel of claim 1, wherein the double trigger assembly includes a first trigger arm pivotally mounted relative to the reel stem; a drag actuator arm secured to and depending from the first trigger arm, the drag actuator arm being engaged with the drag plunger to effect depression of the drag plunger in response to pivoting of the first trigger arm; a second trigger arm pivotally mounted relative to the reel stem; and a free spool actuator arm secured to and depending from the second trigger arm, the free spool actuator arm being positioned for engagement with a distal end of the main shaft to effect depression of the main shaft in response to pivoting of the second trigger arm.

3. The double trigger actuated reel of claim 2, wherein the drag plunger is threaded into the drag actuator arm; and further comprising a drag dial coupled to the drag plunger and positioned for abutting engagement against a portion of the main body so as to limit the drag plunger to a desired maximum depression of the drag actuator arm.

4. The double trigger actuated reel of claim 2, wherein the drag plunger is fixed to the drag actuator arm; and further comprising a drag dial threaded to the drag plunger and positioned for abutting engagement against a portion of the main body so as to limit the drag plunger to a desired maximum depression of the drag actuator arm.

5. The double trigger actuated reel of claim 1, wherein the first trigger arm is substantially longer than the second trigger arm, with the second trigger arm extending below the first trigger arm.

6. The double trigger actuated reel of claim 1, wherein the first trigger arm is shaped so as to define a through-extending cavity within which the second trigger arm is pivotally mounted.

7. The double trigger actuated reel of claim 1, wherein the double trigger assembly includes a first trigger arm pivotally mounted relative to the reel stem; a free spool actuator arm secured to and depending from the first trigger arm, the free spool actuator arm being positioned for engagement with a distal end of the main shaft to effect depression of the main shaft in response to pivoting of the first trigger arm; a second trigger arm pivotally mounted relative to the reel stem; and a drag actuator arm secured to and depending from the second trigger arm, the drag actuator arm being engaged with the drag plunger to effect depression of the drag plunger in response to pivoting of the second trigger arm.

8. The double trigger actuated reel of claim 7, wherein the first trigger arm is substantially longer than the second trigger arm with the second trigger arm extending below the first trigger arm.

9. The double trigger actuated reel of claim 8, wherein the first trigger arm is shaped so as to define a through-extending cavity within which the second trigger arm is pivotally mounted.

10. The double trigger actuated reel of claim 7, wherein the drag plunger is threaded into the drag actuator arm; and further comprising a drag dial coupled to the drag plunger and positioned for abutting engagement against a portion of the main body so as to limit the drag plunger to a desired maximum depression of the drag actuator arm.

11. The double trigger actuated reel of claim 7, wherein the drag plunger is fixed to the drag actuator arm; and further comprising a drag dial threaded to the drag plunger and positioned for abutting engagement against a portion of the main body so as to limit the drag plunger to a desired maximum depression of the drag actuator arm.

12. A double trigger actuated reel comprising:

a main body supportable relative to a fishing rod;

a reel stem projecting from the main body;

a reel mechanism mounted to the main body and including a spool for receiving fishing line;

a double trigger assembly movably mounted relative to the main body and including a first trigger arm pivotally mounted at a first location and a second trigger arm pivotally mounted at said first location, wherein said first trigger arm extends substantially adjacent to and in the same direction as said second trigger arm, wherein said first and second trigger arms extend relative to said fishing rod so as to enable the user to grasp the fishing rod with one hand and manipulate said first end second trigger arms with at least one finger of said hand without substantial movement of said hand relative to said rod: wherein pivoting of said first trigger arm effects a first actuation of the reel mechanism, and second trigger arm effects a second actuation of the reel mechanism.

13. The double trigger actuated reel of claim 12, wherein the double trigger assembly includes a first trigger arm pivotally mounted relative to the reel stem; a first actuator arm secured to and depending from the first trigger arm; a second trigger arm pivotally mounted relative to the reel stem; and a second actuator arm secured to and depending from the second trigger arm.

14. The double trigger actuated reel of claim 12, wherein the first trigger arm is substantially longer than the second trigger arm, with the second trigger arm extending below the first trigger arm.

15. The double trigger actuated reel of claim 12, wherein the first trigger arm Is shaped so as to define a through-extending cavity within which the second trigger arm is pivotally mounted.

* * * * *

UNITED STATES PATENT AND TRADEMARK OFFICE
CERTIFICATE OF CORRECTION

PATENT NO. : 5,692,691
DATED : December 2, 1997
INVENTOR(S) : Chikara Fujigiwa

It is certified that error appears in the above-indentified patent and that said Letters Patent is hereby corrected as shown below:

In Claim 15, column 6, line 60 of the patent, change "Is" before shaped to -is-.

column 1, line 31 "is teaching" should read -is no teaching-.

Signed and Sealed this

Ninth Day of June, 1998

Attest:

BRUCE LEHMAN

Attesting Officer

Commissioner of Patents and Trademarks